(12) United States Patent
Svanholm (10) Patent No.: US 8,629,905 B2
(45) Date of Patent: Jan. 14, 2014

(54) LOCALIZATION OF A SURVEYING INSTRUMENT IN RELATION TO A GROUND MARK

(75) Inventor: Set Svanholm, Sollentuna (SE)

(73) Assignee: Trimble AB, Danderyd (SE)

( * ) Notice: Subject to any disclaimer, the term of this patent is extended or adjusted under 35 U.S.C. 154(b) by 581 days.

(21) Appl. No.: 12/735,279

(22) PCT Filed: Jun. 26, 2008

(86) PCT No.: PCT/EP2008/058175
§ 371 (c)(1),
(2), (4) Date: Aug. 18, 2010

(87) PCT Pub. No.: WO2009/106141
PCT Pub. Date: Sep. 3, 2009

(65) Prior Publication Data
US 2010/0309311 A1    Dec. 9, 2010

(30) Foreign Application Priority Data

Feb. 12, 2008  (WO) ................. PCT/EP2008/001053
Feb. 29, 2008  (WO) ................. PCT/EP2008/052531

(51) Int. Cl.
*H04N 7/18*    (2006.01)
(52) U.S. Cl.
USPC .......................................... 348/135; 139/139
(58) Field of Classification Search
USPC ................................................. 348/135–143
See application file for complete search history.

(56) References Cited

U.S. PATENT DOCUMENTS

| 5,949,548 A | 9/1999 | Shirai et al. |
| 6,384,902 B1 | 5/2002 | Schneider |

(Continued)

FOREIGN PATENT DOCUMENTS

| CN | 1727845 A | 2/2006 |
| CN | 101101210 | 1/2007 |

(Continued)

OTHER PUBLICATIONS

"Determining the Epipolar Geometry and its Uncertainty: A Review", International Journal of Computer Vision, 27(2), pp. 161-198 (1998), hereinafter Zhang.*

(Continued)

*Primary Examiner* — Andy Rao
(74) *Attorney, Agent, or Firm* — Harness, Dickey & Pierce, P.L.C.

(57) ABSTRACT

A method is disclosed for localizing a surveying instrument having a housing including at least one camera in relation to a mark located at a ground level. The method comprises the steps of capturing a first image of the ground below the housing in a first camera position and orientation, wherein the first camera position is eccentric to a vertical rotational axis of the surveying instrument, identifying an object point corresponding to the mark in the first image, measuring first image coordinates of the object point in the first image. The method further comprises the steps of capturing a second image of the ground below the housing in a second camera position and orientation, identifying in the second image, an object point corresponding to the mark, and measuring second image coordinates of the object point in the second image. The height of a rotation center of the surveying instrument above the mark is then determined based on the first camera position and orientation, the first image coordinates, the second camera position and orientation, the second image coordinates, and camera calibration data. Furthermore, a surveying instrument for performing the method is disclosed.

21 Claims, 6 Drawing Sheets

(56) References Cited

U.S. PATENT DOCUMENTS

| | | |
|---|---|---|
| 6,411,372 B1 | 6/2002 | Donath et al. |
| 6,453,569 B1 | 9/2002 | Kumagai et al. |
| 6,559,931 B2 | 5/2003 | Kawamura et al. |
| 6,688,010 B1 | 2/2004 | Schwaerzler |
| 7,200,945 B2 * | 4/2007 | Endo ............................ 33/290 |
| 7,503,123 B2 * | 3/2009 | Matsuo et al. ................. 33/290 |
| 7,508,980 B2 | 3/2009 | Otani et al. |
| 7,697,749 B2 * | 4/2010 | Ogawa ........................ 382/154 |
| 2003/0048438 A1 * | 3/2003 | Kawamura et al. ........ 356/141.1 |
| 2004/0131248 A1 | 7/2004 | Ito et al. |
| 2005/0057745 A1 * | 3/2005 | Bontje .................... 356/139.03 |
| 2006/0013474 A1 * | 1/2006 | Kochi et al. ................. 382/154 |
| 2006/0017938 A1 | 1/2006 | Ohtomo et al. |
| 2006/0021236 A1 | 2/2006 | Endo |
| 2006/0167648 A1 | 7/2006 | Ohtani |
| 2007/0065004 A1 | 3/2007 | Kochi et al. |
| 2007/0104353 A1 | 5/2007 | Vogel |
| 2008/0120855 A1 | 5/2008 | Matsuo et al. |
| 2010/0074532 A1 | 3/2010 | Gordon et al. |

FOREIGN PATENT DOCUMENTS

| | | |
|---|---|---|
| CN | 101101210 A | 1/2008 |
| DE | 144 967 | 11/1980 |
| DE | 102007030784 A1 | 1/2008 |
| EP | 0971207 A1 | 1/2000 |
| EP | 0997704 A1 | 5/2000 |
| EP | 1 139 062 | 10/2001 |
| EP | 1 607 718 A2 | 12/2005 |
| EP | 1655573 A2 | 5/2006 |
| JP | 04198809 A | 7/1992 |
| JP | 2000131060 A | 5/2000 |
| JP | 2005017262 A | 1/2005 |
| JP | 2007147422 A | 6/2007 |
| WO | WO-2004057269 A1 | 7/2004 |
| WO | WO-2005059473 A2 | 6/2005 |
| WO | WO 2009/100728 | 8/2009 |
| WO | WO 2009/100774 | 8/2009 |
| WO | WO-2009100728 A1 | 8/2009 |
| WO | WO 2009/106141 | 9/2009 |
| WO | WO-2009106141 A1 | 9/2009 |

OTHER PUBLICATIONS

Zhang Z et al.: "Photo Total Station System an Integration of Metric Digital Camera and Total Station" Conference on Optical 3-D Measurement Techniques, XX, XX, vol. I, Sep. 22, 2003, pp. 176-182, XP009045199.

International Search Report (PCT/EP2008/058175).

International Search Report (PCT/EP2008/001053).

International Search Report (PCT/EP2008/052531).

Chinese Office Action dated Mar. 12, 2012 issued in corresponding Chinese Application No. 200880125829.7 and English translation thereof.

International Search Report dated Nov. 21, 2008 in related application No. PCT/EP2008/058183.

International Preliminary Report on Patentability and Written Opinion dated Apr. 15, 2010 issued in related application No. PCT/EP2008/052531.

Chinese Office Action dated Jun. 13, 2013 for corresponding Chinese Application No. 200880125829.7.

U.S. Office Action dated Mar. 21, 2013 for co-pending U.S. Appl. No. 12/735,582.

* cited by examiner

LOCALIZATION OF A SURVEYING INSTRUMENT IN RELATION TO A GROUND MARK

TECHNICAL FIELD

The present invention relates to a method for localizing a surveying instrument, such as a total station, in a coordinate system, for instance a ground-based coordinate system. In particular, the present invention relates to a method for determining the height, in relation to a mark located at the ground level, of a surveying instrument having a housing including at least one camera and a method for localizing the surveying instrument in relation to the mark.

BACKGROUND

The art of surveying involves the determination of unknown positions, surfaces or volumes of objects using measurements of angles and distances. In order to make these measurements, a surveying instrument frequently comprises an electronic distance measurement unit (EDM unit) which may be integrated in a theodolite, thereby forming a so-called total station. A total station combines electronic, optical and computer techniques and is furthermore provided with a computer or control unit with writable information for controlling the measurements to be performed and for storing data obtained during the measurements. A typical total station comprises a base with tribrach mounted on a tripod, an alidade mounted on the base for rotation about a vertical axis and a center unit mounted on the alidade for rotation about a horizontal axis. The center unit of the total station comprises a telescope and optical elements for aiming at a target. In particular, the center unit is provided with an EDM unit which operates generally in the direction of the optical axis of the center unit, i.e. along the line of sight. In, for example, WO 2004/057269 by the same applicant, such a total station is described in more detail. Preferably, the total station calculates the position of a target in a coordinate system, e.g. a fixed ground-based coordinate system. However, as the total station measures the position of the target relative to its own position, the position (or location) of the total station in the fixed ground-based coordinate system needs to be known.

According to a first alternative, the position of the total station in a fixed ground-based coordinate system may be determined by a method called "free stationing". In this method, the surveying instrument is placed at an arbitrarily chosen location in the coordinate system (e.g. at a worksite). First, a leveling procedure is performed such that the total station is not tilted when mounted on the tripod. In particular, it is determined whether the vertical rotational axis (nadir) of the total station is aligned with a vertically plumbed axis, i.e. the nadir of the instrument extends vertically. Then, the directions, i.e. the vertical and horizontal angles, and optionally the distances to two (or more) targets placed at two (or more) known points of the ground-based coordinate system are measured. These known points may also be called control points. The control points of the ground-based coordinate system correspond to reference points or reference marks located at the ground level, and the coordinates of these control points in the ground-based coordinate system are known. Once the directions to these two (or more) control points are obtained, the location of the total station, i.e. the location coordinates of the total station, in the ground-based coordinate system can be determined. A drawback of free stationing is that it is difficult to retrieve the location at which the total station is initially positioned if the total station needs to be moved to another position and then moved back to the initial position for e.g. acquisition of further measurements. Marking on the ground of the location at which a total station is positioned is difficult to achieve with high accuracy.

According to another alternative, the total station may be directly positioned above a control point of the ground-based coordinate system. However, an accurate positioning of the total station above such a control point is a quite tedious procedure. First, the tripod is approximately set over the control point and roughly leveled. The total station is then mounted on the tripod and centered above the control point by looking through the eye piece of an optical plummet. The eye piece provides a view with a center mark that allows centering of the total station directly over the control point. The final centering is performed according to an iterative procedure during which a surveyor slides the total station over the tripod (e.g. by moving the tribrach) until the total station is centered over the control point, i.e. with the center mark seen in the eye piece over the control point. Once the total station is centered and leveled, the total station is firmly attached to the tripod. At this stage, the coordinates (x, y) of the total station in the ground-based coordinate system are known and correspond to the coordinates of the control point. However, a complete localization of the total station requires also a determination of the height at which the total station is located and an orientation of the direction at which the total station is pointing. The height is normally determined using a measuring tape or a similar device; however, the accuracy of such a measurement is usually limited, thereby decreasing the accuracy of the measurements later made by the surveying instrument. The orientation of the total station is achieved by pointing the center unit of the surveying instrument at another control point (having a known position) located at a remote distance from the total station and determining the horizontal angle of the total station to this control point.

In summary, the prior art methods described above are tedious, of limited accuracy, time consuming and not user friendly.

Thus, there is a need for providing new methods and systems that would overcome these problems.

SUMMARY

An object of the present invention is to wholly or partly overcome the above disadvantages and drawbacks of the prior art and to provide a more efficient alternative to the above techniques and prior art.

More specifically, it is an object of the present invention to provide a method for localizing a geodetic (or surveying) instrument in relation to a mark located at a ground level (also called ground mark or mark in the following) under the instrument and a geodetic instrument thereof.

A particular object of the present invention is to provide a method and surveying instrument for facilitating the measurement of the height of the instrument above the ground and in particular the height above the mark located at the ground level.

Another object of the present invention is to provide a method and surveying instrument facilitating the localization of the surveying instrument in relation to the mark located at the ground level, i.e. the determination of the relative three-dimensional coordinates of a rotation center of the surveying instrument in relation to the ground mark.

Another object of the present invention is to provide a method and surveying instrument for reducing the time required for localization of the surveying instrument in a coordinate system. The coordinate system may be a ground-based coordinate system or a coordinate system where reference points are determined by GPS.

Another object of the present invention is to provide a method and surveying instrument for increasing the accuracy in localization of the surveying instrument in a coordinate system.

Another object of the present invention is to provide a method and surveying instrument for facilitating the retrieval of the position of the instrument after it has been moved from said position.

These and other objects of the present invention are achieved by means of a method, a surveying instrument and a computer program product having the features defined in the independent claims. Preferable embodiments of the invention are characterized by the dependent claims.

Throughout the application, the terms "geodetic instrument", "surveying instrument" and "total station" will be used interchangeably. Further, the terms "position" and "location" will also be used interchangeably.

Hence, according to a first aspect of the present invention, a method for localizing a surveying instrument having a housing including at least one camera is provided. The method comprises the steps of capturing a first image of the ground below the housing in a first camera position and orientation, wherein the first camera position is eccentric to a vertical rotational axis of the surveying instrument, identifying an object point corresponding to the mark in the first image, and measuring first image coordinates of the object point in the first image. The method further comprises the steps of capturing a second image of the ground below the housing in a second camera position and orientation, identifying, in the second image, an object point corresponding to the mark, and measuring second image coordinates of the object point in the second image. The height of the rotation center of the surveying instrument above the mark is then determined based on the first camera position and orientation, the first image coordinates, the second camera position and orientation, the second image coordinates, and camera calibration data.

According to a second aspect of the present invention, a geodetic instrument is provided. The geodetic instrument comprises at least one camera adapted to capture a first image of the ground below the housing in a first camera position and orientation and a second image of the ground below the housing in a second camera position and orientation. The first camera position is eccentric to the vertical rotational axis of the surveying instrument. The surveying instrument further comprises an identifying unit adapted to identify an object point corresponding to a mark located at a ground level under the instrument in the captured images, a measuring unit adapted to measure first and second image coordinates of the object point in the first and second images, and a processor adapted to determine the height of the rotation center of the surveying instrument above the mark based on the first position and orientation, the first image coordinates, the second position and orientation, the second image coordinates, and camera calibration data.

According to a third aspect of the present invention, there is provided a computer program product comprising computer program code portions adapted to perform the method in accordance with the first aspect of the present invention when loaded and executed in a computer.

The present invention makes use of an understanding that the relative coordinates of a mark located at the ground level in relation to a rotation center of a surveying instrument can be determined by the surveying instrument using the eccentricity of at least one camera for capturing two images in two known camera positions and orientations, and identification of an object point and the coordinates thereof in the two images together with camera calibration data. The present invention makes also use of an understanding that the very accurate measurements of the relative coordinates of a ground mark can be used for measuring the height of the instrument and for surveying instrument stationing.

According to an embodiment, the method of the present invention further comprises the step of determining the relative two-dimensional coordinates, in a horizontal plane, of the rotation center of the surveying instrument in relation to the mark based on the first camera position and orientation, the first image coordinates and camera calibration data, and/or the second camera position and orientation, the second image coordinates and camera calibration data. In other words, after determination of the height of the instrument above the ground mark, the two-dimensional coordinates of the rotation center of the instrument, in a horizontal plane, may be determined based on information and data related to at least one of the two captured images. As long as the height has been determined, information regarding one of the two captured images and camera position is sufficient to determine the two-dimensional coordinates using trigonometry. In this context, it may be advantageous to compare the quality of the two captured images and select the captured image providing the highest quality in terms of e.g. resolution. However, both images may also be used to determine the two-dimensional coordinates of the rotation center of the instrument. As a result, the relative three-dimensional coordinates of the rotation center of the instrument in relation to the ground mark are determined.

The present invention is based on the use of triangulation to obtain the relative coordinates of a ground mark in relation to a rotation center of the instrument. In the present invention, a baseline for triangulation is obtained by the points corresponding to the first position of the at least one camera and the second position of the at least one camera. In this respect, it is noted that the length of the baseline determines the accuracy in measuring the height and coordinates of the total station, where a long baseline provides a higher accuracy than a short baseline. The length of the baseline is known by calibration since the position of the camera in relation to the vertical rotational axis of the instrument is known by calibration, i.e. measured after assembly of the instrument. The angular orientation of the camera in relation to the baseline is also calibrated and may be measured after assembly of the instrument. Such calibration data can be stored in the instrument.

According to an embodiment, the method of the present invention further comprises the step of orienting the horizontal pointing direction of the surveying instrument by aiming at a reference point located at a remote position from the surveying instrument, wherein the reference point is located at a known location in a coordinate system. The orientation of the surveying instrument to a known control point together with the determination of the relative three-dimensional coordinates of the surveying instrument in relation to the ground mark result in a complete localization of the surveying instrument in the coordinate system.

The present invention is advantageous in that it provides a cheap and fast solution for determining the height and/or the coordinates of a total station in relation to a ground reference point. In particular, the present invention is advantageous in that the total station does not need to be physically positioned over the mark located at the ground level with high accuracy. It is indeed enough to position the total station, and tripod on which the total station is mounted, such that the mark is comprised within the field of view of the camera. The requirements on positioning of the total station are reduced since it is sufficient if the ground mark is located in the union of the field of view provided by the camera in the first position and orientation and the field of view provided by the camera in the second position and orientation. The object point corresponding to the ground mark is then comprised in the images captured by the camera.

Any dislocation between the nadir of the instrument and the ground mark may then be taken into account during the measurements performed by the total station as the relative position of the total station in relation to the ground mark is determined in accordance with the method of the present invention. As a result, a surveyor does not need to implement any time-consuming procedure to exactly aligned the nadir of the total station with the ground mark.

According to an embodiment, the second position is also eccentric to the vertical rotational axis of the instrument, which is advantageous in that assembly of the instrument is facilitated since there is no need of arranging any new component along the nadir of the instrument.

However, according to an embodiment, the second position is coaxial with the nadir of the instrument.

According to the present invention, the at least one camera is mounted eccentric with respect to the nadir of the total station by means of a mechanical arrangement for folding out the camera from the instrument housing such that the field of view of the camera covers the area below the instrument. The optical characteristics of the at least one camera and the first and second sets of position and orientation are selected such that the area between the legs of the tripod at the ground level can be viewed in the images captured by the camera.

Arrangement of the at least one camera far from the nadir of the instrument is beneficial since a broad view of the area between the legs of the tripod is provided. The at least one camera is preferably arranged such that the captured image provides a view of the ground as seen from the outside of the area defined by the legs of the tripod on which the instrument is mounted. In such a configuration, the object points corresponding to the legs of the tripod on the captured images define the area in which the object point corresponding to the ground mark is located.

Although the method of the present invention is defined using two images in two different positions and orientations, it will be understood that more than two images may be used to localize the total station in a coordinate system, which is advantageous in order to increase the accuracy in the determination of the height and/or the relative three-dimensional coordinates of the instrument.

The method of the present invention may be implemented when setting up the total station over a known reference point, i.e. with the location of the mark located at the ground level known in a coordinate system. In the present embodiment, the method of the present invention is used to determine the location of the total station in the coordinate system based on the relative coordinates of the total station in relation to the known ground mark.

Alternatively, if free stationing has been performed, a surveyor may wish to localize the total station in relation to a new (unknown) ground mark before setup disassembly. According to this embodiment, a surveyor places, with little accuracy, the new ground mark between the legs of the tripod (i.e. below the instrument), and the coordinates of the center of the total station relative to the new ground mark are determined in accordance with the present invention. The coordinates of the new reference point are then determined based on the coordinates of the total station, which were obtained by free stationing. In other words, according to the present embodiment, the surveying instrument is positioned at a known location in a coordinate system and the location of a reference point located at the ground level can be determined. The coordinates of the new ground mark are recorded and the surveyor may then come back to the new ground mark to perform further measurements if necessary. It is then sufficient to position the total station over the new ground mark such that the images captured by the at least one camera comprise the new ground mark. Alignment of the nadir of the total station with the new ground mark is not required.

According to an embodiment, the housing of the surveying instrument is rotated around its rotation center so that the at least one camera is moved from the first camera position and orientation to a second camera position and orientation. Even though a rotation is undertaken prior to capturing the second image, the rotation center of the surveying instrument is retained in a fixed position when the second image is captured, i.e. in the same position as when the first image was captured. The present embodiment is advantageous in that only one camera is required to implement the method of the present invention, thereby reducing cost of the instrument.

For example, the instrument may be turned around its rotation center by an angle of 120 degrees to capture, with the camera, three different images of the ground (between the tripod legs) corresponding to three different sets of position and orientation.

According to another embodiment, the surveying instrument comprises at least two cameras of which a first camera is arranged in the first camera position and orientation and a second camera is arranged in the second camera position and orientation. According to an embodiment, the second camera may be positioned eccentric to the vertical rotational axis of the surveying instrument.

However, according to another embodiment, the second camera may be positioned along the nadir of the instrument (i.e. coaxial with the nadir of the instrument). In the present embodiment, the camera arranged along the nadir provides the relative position, in a horizontal plane, of the total station in relation to the mark located at the ground level. According to the present embodiment, the method further comprises the step of capturing, with the image sensor arranged along the nadir, an image of the ground below the housing of the instrument. The determination of the relative position of the rotation center of the instrument in relation to the mark comprises the steps of identifying an object point corresponding to the mark in the captured image, measuring the coordinates of the object point in the captured image, and determining the relative two-dimensional coordinates of the rotation center of the instrument in relation to the mark based on the determined height, the measured coordinates of the object point and the orientation and position of the image sensor in relation to the vertical rotational axis of the instrument.

With respect to the embodiment in which the second camera is coaxial with the nadir of the instrument, the calibration data representative of the relation of the image sensor can be determined by capturing a first image using the image sensor, rotating the instrument around its vertical axis to a new rotational position, capturing a second image using the image sensor, and processing the first and second images to correlate a nadir point for the instrument vertical rotational axis in relation to the image sensor. In particular, the first and second images may be captured at rotational positions substantially 180 degrees from each other.

Using two cameras, the first image and the second image may be captured simultaneously, which is advantageous in that the instrument does not need to be rotated, thereby ensuring stability of the instrument during the capturing of the images.

The present invention also provides a total station which comprises various means for carrying out the above-described method.

In addition, the present invention can be implemented in a computer program that, when executed, performs the inventive method in a surveying instrument. The computer program may, for example, be downloaded into a surveying instrument as an upgrade. As will be understood, the inventive method can be implemented for a surveying instrument using software, hardware or firmware, or a combination thereof, as desired in view of the particular circumstances.

BRIEF DESCRIPTION OF THE DRAWINGS

In the following detailed description, reference is made to the accompanying drawings, on which.

DETAILED DESCRIPTION

Figure 1:
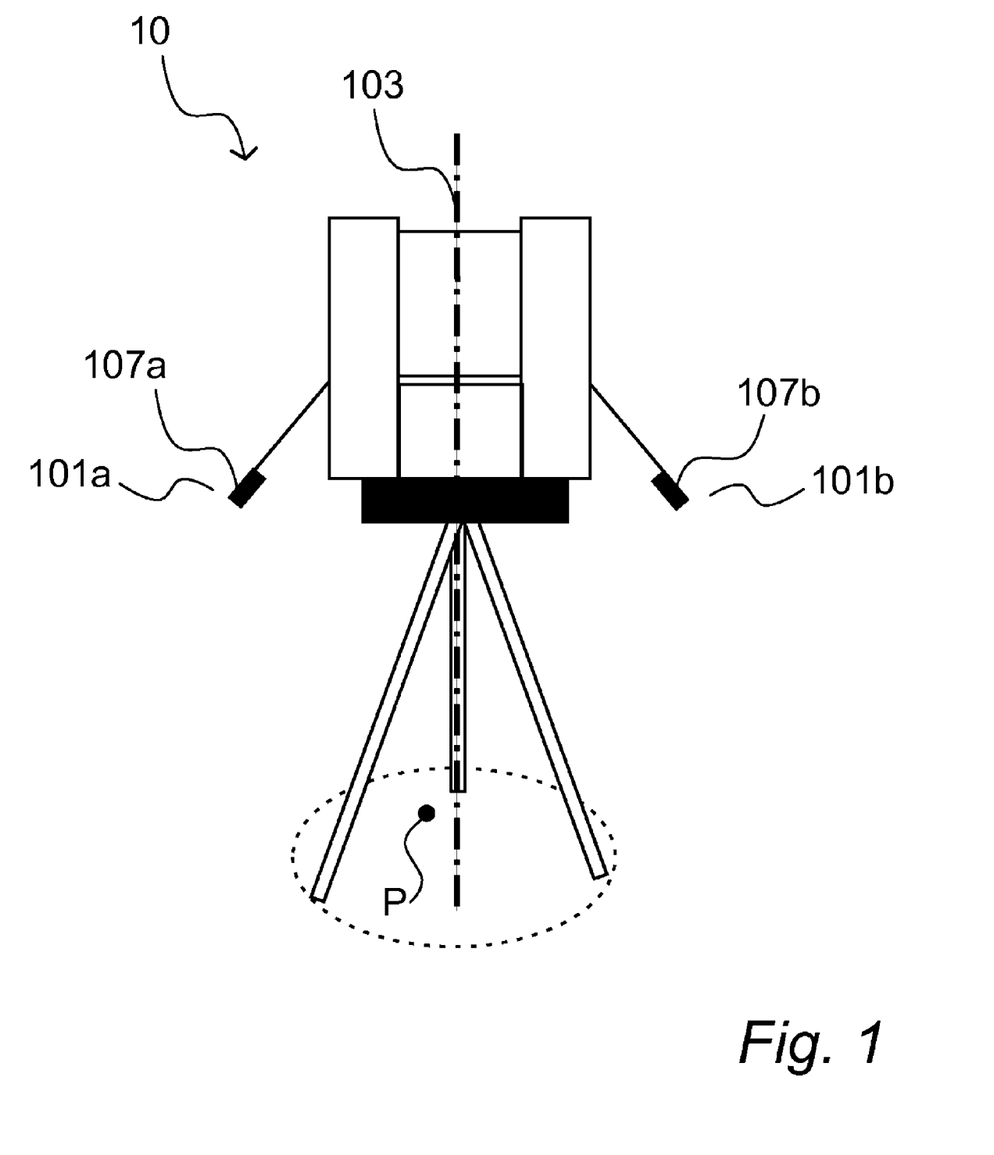
FIG. 1 is a side view of a surveying instrument according to an embodiment of the present invention.

FIG. 1 illustrates schematically a total station 10 comprising at least one camera positioned in a first camera position 101a and in a second camera position 101b for capturing images of the ground below the instrument (or housing of the total station). According to the present invention, an object point relating to a mark located at the ground level, denoted by the letter P in the figures, is identified in images captured by the camera of the surveying instrument.

Figure 2:
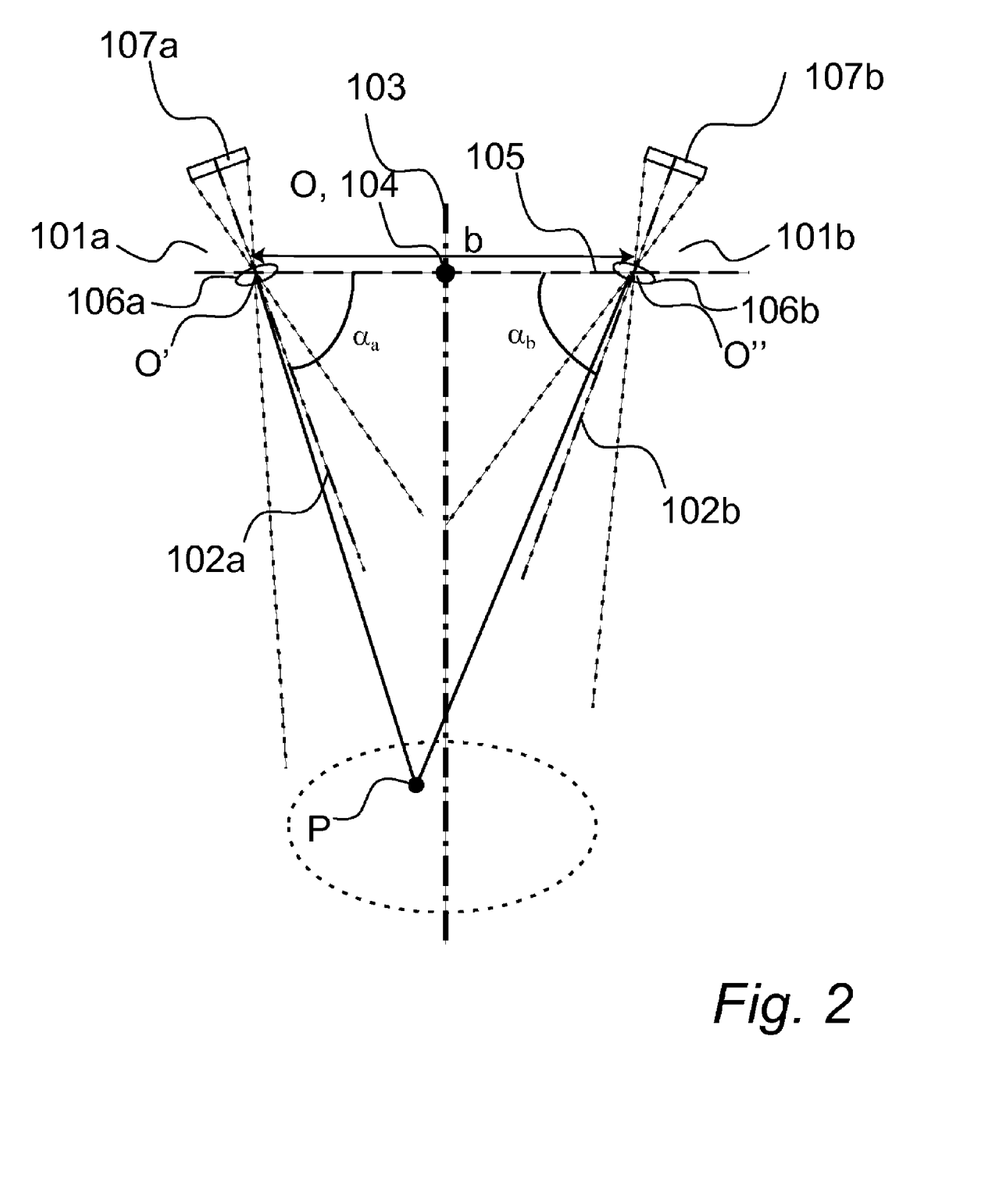
FIG. 2 schematically shows, in two dimensions, some of the parameters of the surveying instrument used in the method of the present invention.

With reference to both FIGS. 1 and 2, there is shown at least one camera sensor 107, such as a CMOS camera or a CCD, for capturing a first image centered about a first camera axis 102a in the first position 101a and for capturing a second image centered about a second camera axis 102b in the second position 101b. The camera axis 102a, 102b are perpendicular to the camera sensor or plane in which the image is formed on the sensor. The images are formed on the camera sensor 107 by means of an optical system such as a lens 106. As illustrated in FIG. 2, the first camera position 101a and the second camera position 101b define a baseline 105 having a length b which corresponds to the distance between the first camera position 101a and the second camera position 101b. The first camera position 101a is eccentric with respect to the vertical rotational axis 103 of the instrument, and in particular the rotation center 104 located along the vertical rotational axis 103 in FIG. 2, and the eccentricity of the first position 101a is determined by the distance to the vertical rotational axis (or rotational center as shown in FIG. 2), which is equal to half of the baseline in the embodiment shown in FIGS. 1 and 2. It is noted that, although the rotation center O of the instrument located along the vertical rotational axis of the instrument is shown to be aligned with the baseline in FIG. 2, the rotation center O is not necessarily located along the baseline 105.

Although not necessary, the second camera position 101b may also be eccentric with respect to the vertical rotational axis 103 of the instrument and the eccentricity of the second position 101b is determined by the distance to the vertical rotational axis, which is also equal to half of the baseline in the embodiment shown in FIGS. 1 and 2. However, the second camera position 101b may also be located closer to the vertical rotation axis, e.g. closer to the rotational center 104 along the baseline. According to an embodiment, the second camera position is coaxial with the nadir 103 of the instrument.

The camera sensor is also characterized by its orientation in the first and second positions, i.e. the angles $\alpha_a$, $\alpha_b$, respectively. The angle $\alpha_a$ is the angle formed between the camera axis 102a of the first camera and the baseline 105 when the camera sensor is in the first position, and the angle $\alpha_b$ is the angle formed between the camera axis 102b of the second camera and the baseline 105 when the camera sensor is in the second position. These angles correspond to the angles at which the camera is oriented to view the area located between the legs of the tripod.

It is noted that, for simplicity, FIGS. 1 and 2 show views of the surveying instrument in two dimensions only. However, a person skilled in the art would understand that the elements and features shown in FIGS. 1 and 2 may be defined in terms of other angles than those shown in the figures. For example, the orientation of the camera may also be defined by the angle formed by the image plane defined by the camera sensor around the arm on which the camera is arranged. Alternatively, the orientation of the camera may be defined with respect to the vertical and horizontal axis of the instrument.

The camera optical axis should ideally be perpendicular to the plane of the camera sensor 107 and the optical system should be free from distortions or aberrations. However, this is not the case in practice and this may be taken into account by calibration of the image sensor.

Figure 3:
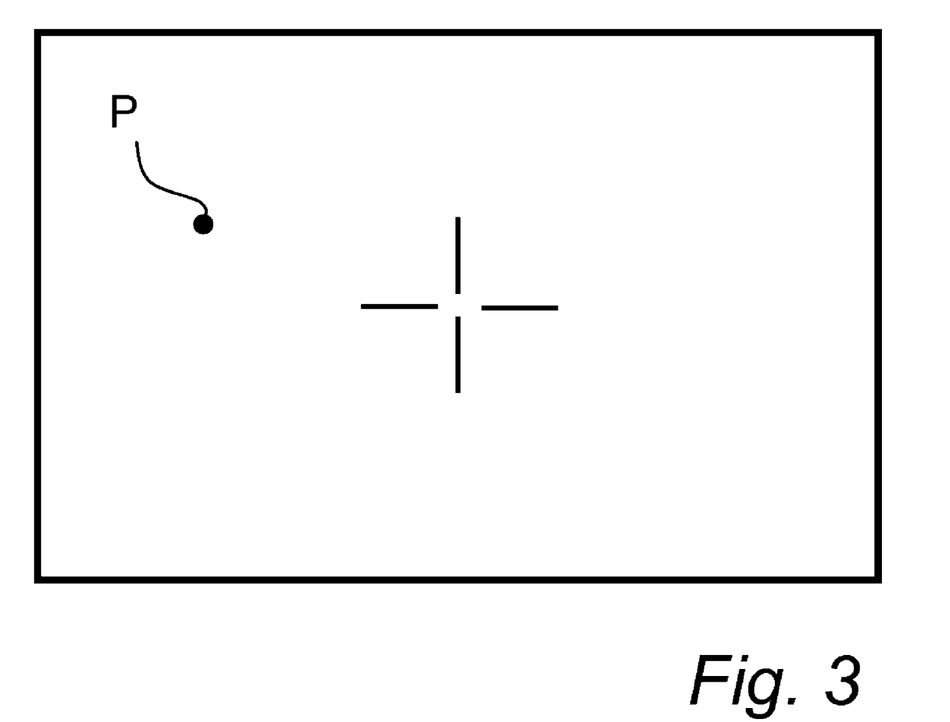
FIG. 3 schematically shows an image or video frame that may be captured by the camera and presented on a screen of the instrument.

FIG. 3 schematically shows an image captured by the camera. Such image may be presented to an operator using the surveying instrument, such that the operator may select the image object point of the mark by clicking in the image or otherwise indicating the desired object point.

Figure 4:
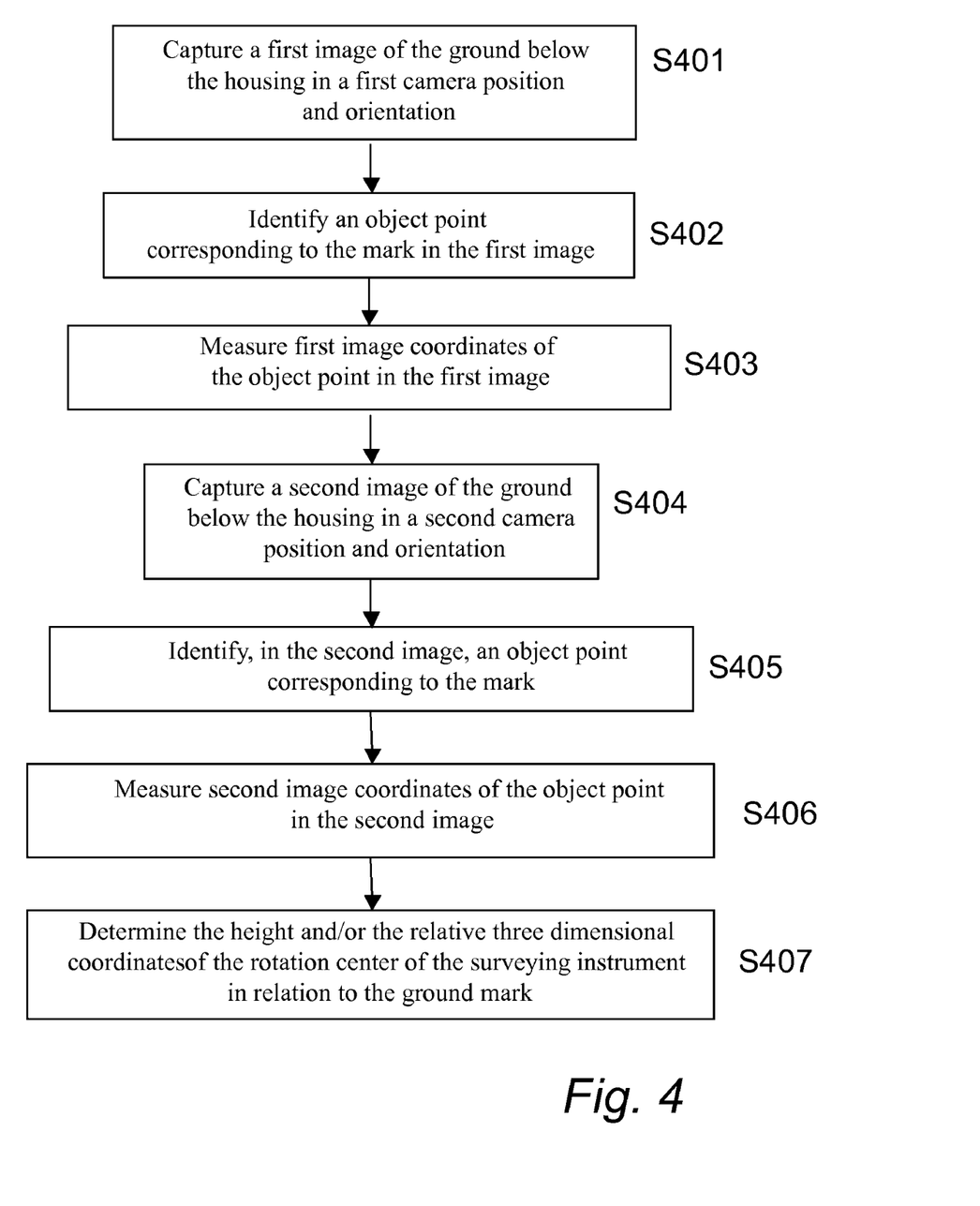
FIG. 4 is a general outline of the inventive method.

General steps of the method according to the present invention are outlined in FIG. 4. The method is performed in a surveying instrument comprising at least one camera and starts with capturing, in a step S401, of a first image using the camera in a first camera position and orientation, the first camera position being eccentric to the vertical rotational axis of the surveying instrument. In step S402, an object point corresponding to a ground mark is identified in the first image, which may be a snapshot or a frame of a video feed captured by the camera. For example, the mark may be identified by selection by an operator clicking on a screen showing the image captured by the camera, or in any other suitable way of indicating the mark with respect to the captured image. It is also envisaged that the identification of the mark can be made in other ways, such as edge detection or identification of mark features. In the case where a new ground mark is placed under the total station, the mark may comprise features such as arrows for facilitating identification of the mark in the captured images. Once the mark has been selected by identification of the object point in the first image in the step S402, first image coordinates of the object point in the first image are measured in a step S403.

The method then proceeds with capturing, in a step S404, of a second image using the camera in a second camera position and orientation, after which the object point identified in the first image is identified in a step S405 in the second image. For example, the object point may be identified by selection by an operator clicking on a screen showing the image captured by the camera, or preferably by means of digital image processing.

Once the object point has been identified in the second image in step S405, second image coordinates of the object point in the second image are measured in a step S406.

Finally, the height of the rotation center of the total station in relation to the mark located at the ground level is determined in a step S407 based on the first camera position and orientation, the first image coordinates, the second camera position and orientation, the second image coordinates, and camera calibration data.

According to an embodiment, the relative two-dimensional coordinates, in a horizontal plane, of the rotation center of the surveying instrument in relation to the mark are determined based on the first camera position and orientation, the first image coordinates and camera calibration data. Alternatively or in addition, the two-dimensional coordinates, in a horizontal plane, of the rotation center of the surveying instrument in relation to the mark are determined based on the second camera position and orientation, the second image coordinates and camera calibration data. Although it is sufficient to use at least one of the data (i.e., camera position and orientation, image coordinates and camera calibration data) corresponding to a single position, the two-dimensional coordinates of the rotation center of the instrument may also be determined based on the first camera position and orientation, the first image coordinates, the second camera position and orientation, the second image coordinates, and camera calibration data.

It is noted that the method of the present invention can be performed to either localize the surveying instrument in a coordinate system if the mark located at the ground level is positioned at a known location in the coordinate system or localize the mark in the coordinate system if the surveying instrument is positioned at a known location in the coordinate system.

To further localize the surveying instrument, the method of the present invention further comprises the step of orienting the horizontal pointing direction of the surveying instrument by aiming at a reference point located at a remote position from the surveying instrument. The reference point used for orienting the pointing direction is positioned at a known location in the coordinate system.

Orientation of the direction from the surveying instrument towards a reference point may be implemented using a telescope of the surveying instrument or a camera mounted on the housing of the instrument such that the field of view of the camera comprises the reference point. The direction to the reference point from the camera may be expressed as horizontal and vertical angles ($\theta^x, \theta^y$) from the camera axis. For this purpose, a function is provided in the instrument (or in an associated control unit) that determines the direction to a reference point or target from the camera by calculating the horizontal and the vertical angles ($\theta^x, \theta^y$) based on pixel coordinates in the image or video feed captured by the camera. Hence, the function $f$ that calculates the horizontal and vertical angles ($\theta^x, \theta^y$) based on image pixels can be described as $$(\theta^x, \theta^y) = f(x, y, C)$$

where x, y are the number of pixels (or more generally, pixel coordinates) of the desired reference point or target in the coordinate system of the camera, and C are calibration factors to be determined for each system. The calibration factors C include details about the camera, such as but not limited to, its eccentricity to the rotation center of the total station and its focal length. For a general description of how to calculate horizontal and vertical angles based on an image captured by a camera in the instrument, reference is made to the above-mentioned WO 2005/059473.

According to an embodiment, the surveying instrument comprises only one camera. The surveying instrument is then rotated around the rotation center so that the camera is moved from the first camera position and orientation to the second camera position and orientation. The second camera position is also eccentric to the rotation center of the surveying instrument. The first camera position is given by camera calibration data in terms of the horizontal and vertical directions and distances of the camera center to the instrument rotation center. Further, the first camera orientation may be given by calibration data in terms of angles related to the various axis (vertical and horizontal axis) of the instrument or angles related to the arm at which the camera is arranged. Thus, the first camera position and orientation is determined by taking into account the horizontal and vertical directions and distances of the camera center to the instrument rotation center, i.e. camera calibration data in the form of eccentricity parameters.

According to another embodiment, the surveying instrument comprises two cameras of which a first camera is positioned in the first camera position and orientation and a second camera is positioned in the second camera position and orientation. The first and second sets of camera position and orientation are determined by taking into account the horizontal and vertical directions and distances of the camera center to the instrument rotation center, i.e. camera calibration data in the form of eccentricity parameters.

The distances between the vertical rotational axis (or rotation center as shown in FIG. 2) and the camera positions and the angles between the baseline and the image plane of the camera in the first and second positions are preferably calibrated after assembly of the total station at the production stage. It is envisaged to arrange the camera on an arm which may be deployed (or fold out) from the instrument or instrument housing to form a well defined angle with the baseline or housing, such as shown in FIG. 1. It is also envisaged that, alternatively, a number of well defined angles are selectable by a surveyor such that the area covered by the field of view of the camera can be adjusted. Alternatively, a surveyor may slide out from the housing of the instrument, in a horizontal plane, the arm on which the camera is arranged.

The camera positions may also be adjustable at well defined distances to the rotation center of the instrument by means of e.g. a telescopic arm.

The instrument would then register the angles and distances corresponding to the first camera position and orientation and corresponding to the second camera position and orientation used when capturing the images and take these data into account for determining the height and/or relative coordinates of the total station in relation to the ground mark.

Further, other calibration data can be considered, for example camera position independent parameters such as the so-called camera constant representing distance between the camera center and image plane and/or parameter of distortion, which depends on the image position. The second camera position and orientation can be derived from the rotation together with camera calibration data.

An implementation of a surveying instrument according to the present invention is schematically shown in FIGS. 1 and 2. For simplicity, a side view of the surveying instrument is shown in two dimensions.

The camera in the first position 101a has a camera center, or projection center, indicated by O', and the camera in the second position 101b has a camera center, or projection center, indicated by O". The positions O' and O" are eccentric to the location O of the rotation center of the instrument. It is to be noted that the surveying instrument is shown having two cameras sensors 107a, 107b but that the present invention may also be implemented with a single camera moved to different positions by rotation of the surveying instrument around its rotation center.

A first image is captured by the camera sensor, when the camera center is located in a first camera position O' eccentric to the location O of the rotation center of the surveying instrument and having a first camera orientation. A mark located at the ground level is selected by identifying an object point in a position P' in the first image.

Once the mark has been selected by identification of the object point in the first image, first image coordinates of the object point in the first image are measured.

Then, a second image is captured by the camera sensor, when the camera center is located in the second camera position O" eccentric to the location O of the rotation center of the surveying instrument and having the second camera orientation. The object point identified in the first image is identified also in the second image in a position P".

Once the object point has been identified in the second image, second image coordinates of the object point in position P" in the second image are measured.

Finally, the height of the rotation center O of the surveying instrument above the ground, i.e. in relation to the ground mark, is determined based on the first camera position and orientation, the first image coordinates, the second camera position and orientation, the second image coordinates, and camera calibration data.

Figure 5:
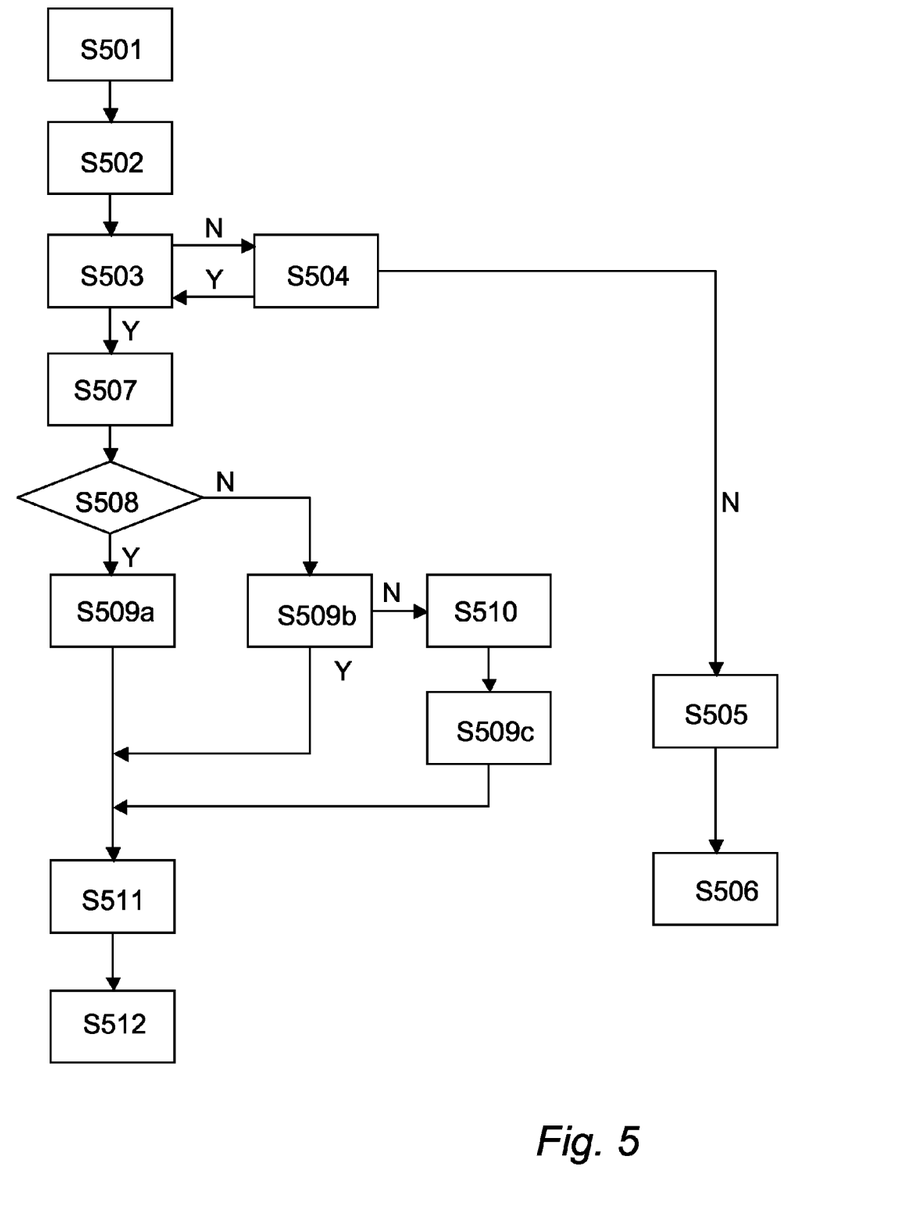
FIG. 5 is an outline of an implementation of the inventive method.

FIG. 5 is an outline of an implementation of the inventive method performed in a surveying instrument comprising one or two cameras such as schematically disclosed in FIGS. 1 and 2. Input to the method are camera calibration data comprising camera and surveying instrument parameters. The method starts in a step S501 with capturing of a first image of the ground below the instrument using the camera in a first camera position and orientation, said first camera position being eccentric to a rotation center of the surveying instrument, after which in a step S502 a mark located at the ground level is selected by identifying an object point in the first image corresponding to the mark. For example, the mark may be identified by selection by an operator clicking on a screen showing the image captured by the camera or automatic detection. Furthermore, image coordinates for the object point in the first image are measured.

After the object point has been identified, it is determined in a step S503 if the object point can be identified using image processing and recognition software. If it cannot it is determined if a pattern in the vicinity of the point is detectable. If this is not the case the uncertainty is displayed in a step S505 and suitable alternative method is used in a step S506.

If a pattern can be detected or if the point can be identified by software in the first image in step S503, the so called epipolar line can be calculated in a step 507 using the first camera position and orientation, the second camera position and orientation, the first image coordinates, first and second camera calibration data, a minimum distance Dmin and a maximum distance Dmax. Then, it is determined in a step S508 if the epipolar line is completely inside the second image. If the epipolar line is partly outside the second image, the algorithm in step S509b assumes a new maximum distance Dmax that corresponds to the size of the camera sensor, thereby reducing the length of the epipolar line thus comprised within the second image. Then, the algorithm searches for the object point along the epipolar line that is within the second image. The maximum distance corresponds to a possible height of the total station over the ground, which for example may be in the order of 0.5 to 3 meters. If the point cannot be identified, a rotation is performed in step S510, which is calculated from epipolar line data, the second camera position and orientation and second camera calibration data. The rotation has an effect that the epipolar line can be located inside the second image. A revised second image will be captured in a revised second camera position and orientation, such that the object can be identified in step S509c along a new epipolar line. If in step S508 the epipolar line is completely inside the second image, the object point is identified in step S509a by searching along the epipolar line in the second image. For example, the object point may be identified by selection by an operator clicking on a screen showing the second image, or preferably by means of digital image processing.

Once the object point has been identified in the second image, second coordinates of the object point in the second image are measured in a step S511. Coordinates of the mark in relation to the rotation center of the surveying instrument are determined based on the first camera position and orientation, the first image coordinates, the second camera position and orientation (or revised second camera position and orientation), the second image coordinates, and camera calibration data. That is, the relative coordinates of the mark are expressed in relation to the rotation center of the surveying instrument (or in the coordinate system of the instrument).

Referring again to FIGS. 1 and 2, the surveying instrument comprises two cameras, wherein a first camera is positioned in a first camera position and orientation and a second camera is positioned in a second camera position and orientation, or a single camera rotated from a first camera position and orientation to a second camera position and orientation. Each camera has a camera center, or projection center, that is eccentric to the vertical rotational axis (in particular the location O of the rotation center) of the instrument, as shown in the figures. However, as mentioned earlier, the instrument may also comprise two cameras of which a first camera is positioned in a first camera position eccentric to the vertical rotational axis of the instrument and a second camera is positioned in a second camera position coaxial with (or along) the vertical rotational axis of the instrument.

A first image is captured in the first camera position, when the first camera center is located in a first position O' eccentric to the location O of the rotation center of the surveying instrument and the first camera having a first camera orientation. A ground mark in position P is selected by identifying an object point in a position P'(x', y') in the first image.

The distance between the first camera position and the second camera position may be denoted b. A second image is captured in the second camera position, the second camera center being located in the second position O" eccentric to the location O of the rotation center of the surveying instrument and the camera having a second camera orientation. The object point identified in the first image is identified in the second image in a position P"(x", y").

The so called collinearity equations are used to estimate the relative coordinates of P in relation to the rotation center of the instrument. For a background of the deriving of the collinearity equations and of calibration of a camera reference is made to WO 2005/059473.

The measured coordinates P' in the first image can be defined by the equations:

$$x' = x_0 - c_K \frac{r_{11'}(X - X_{0'}) + r_{21'}(Y - Y_{0'}) + r_{31'}(Z - Z_{0'})}{r_{13'}(X - X_{0'}) + r_{23'}(Y - Y_{0'}) + r_{33'}(Z - Z_{0'})} + \Delta x$$

$$y' = y_0 - c_K \frac{r_{12'}(X - X_{0'}) + r_{22'}(Y - Y_{0'}) + r_{32'}(Z - Z_{0'})}{r_{13'}(X - X_{0'}) + r_{23'}(Y - Y_{0'}) + r_{33'}(Z - Z_{0'})} + \Delta x$$

The measured coordinates P'' in the second image can be defined by the equations:

$$x'' = x_0 - c_K \frac{r_{11''}(X - X_{0''}) + r_{21''}(Y - Y_{0''}) + r_{31''}(Z - Z_{0''})}{r_{13''}(X - X_{0''}) + r_{23''}(Y - Y_{0''}) + r_{33''}(Z - Z_{0''})} + \Delta x$$

$$y'' = y_0 - c_K \frac{r_{12''}(X - X_{0''}) + r_{22''}(Y - Y_{0''}) + r_{32''}(Z - Z_{0''})}{r_{13''}(X - X_{0''}) + r_{23''}(Y - Y_{0''}) + r_{33''}(Z - Z_{0''})} + \Delta y$$

The following parameters are known from calibration:

$X_0$; $Y_0$; $Z_0$: coordinates from camera position, '=first image; ''=second image.

$r_{ij}$: elements from rotation matrix (i=1 ... 3; j=1 ... 3), '=first image; ''=second image.

$x_0$; $y_0$ coordinates from the principle point (constant, independent of camera position)

$c_K$: camera constant (constant, independent of camera position)

$\Delta x$, $\Delta y$: parameter of distortion. The distortion is known as a polynomial of a higher degree. The distortion depends of the image position and is independent of the camera position.

All parameters are measured or known from camera calibration except from X, Y, Z which are the coordinates of P. Hence, there are three unknowns and four equations. X, Y, Z can be determined with a least square method. It should be noted that there is no limitation to two images to estimate the location of point P, but at least two images are necessary. Hence, two or more images may be used.

However, as mentioned above, once the height of the instrument above the ground has been determined, it is sufficient to determine the relative two-dimensional coordinates of the instrument using information or data corresponding to only one of the two captured images and camera positions.

It should be noted that once the mark has been selected by identification of the object point in the first image, a first direction r' to the mark from the first position O' of the camera center can be determined.

Using this first direction r' together with a maximum distance $D_{max}$ (which may be in the order of 0.5-3 meters), and a minimum distance $D_{min}$ (which may be selected as a single baseline) along the direction r', a section of r' can then be transformed into a section of a so called epipolar line in the second image on which the object point should be located in the second image. Hence, if a pattern has been recognized in the first image around the position P' of the object point in the first image, this pattern may be recognized in the second image, e.g. by means of automatic image processing, by searching along the section of the epipolar line in the second image or in an area around that section. If in alternative, an operator is to identify the mark in the second image, the identification can be simplified by graphical indication of the section of the epipolar line in the second image.

Figure 6:
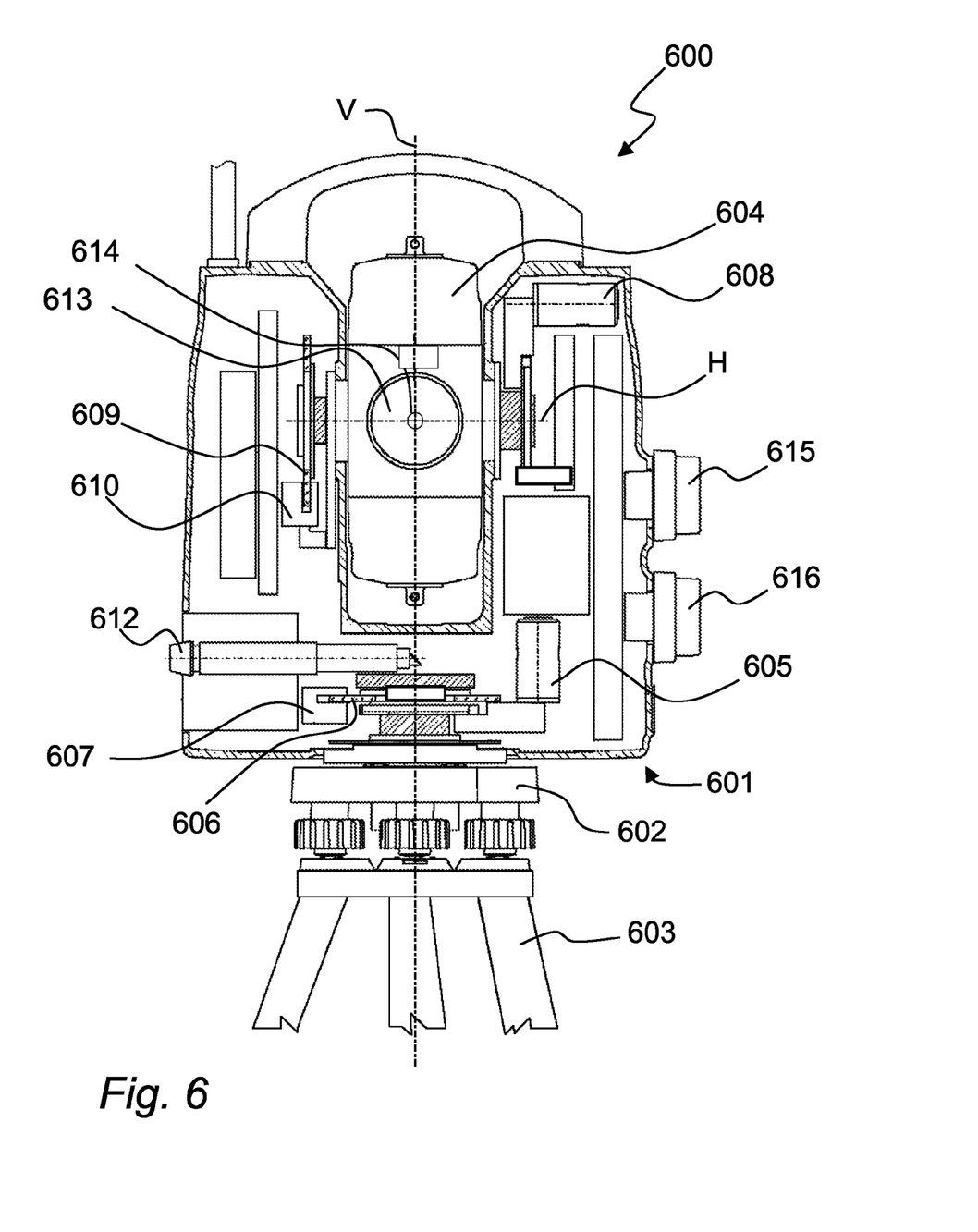
FIG. 6 schematically shows a geodetic instrument according to the present invention.

In FIG. 6, there is shown one example of a total station according to the present invention. In many aspects, the total station comprises features known from previous instruments. For example, the total station 600 shown in FIG. 6 comprises an alidade 601 mounted on a base 602, and has a mounting support structure in the form of a tripod 603. The alidade 601 can be rotated about a vertically oriented rotation axis V, in order to aim the instrument in any desired horizontal direction. In the alidade, there is arranged a center unit 604, which can be rotated about a horizontally oriented rotation axis H, in order to aim the instrument in any desired vertical direction. Measurements made using the total station 600 are typically related to an origin of coordinates located at the intersection between the vertically oriented and the horizontally oriented rotation axes V and H.

For rotation of the alidade about the vertically oriented rotation axis to aim the instrument in any desired horizontal direction, there is provided drive means 605. The rotational position of the alidade 601 is tracked by means of a graduated disc 606 and a corresponding angle encoder or sensor 607. For rotation of the center unit 604 about the horizontally oriented rotation axis, there are provided similar drive means 608, graduated disc 609 and sensor 610.

As mentioned above, the instrument line of sight is centered at the intersection between the vertical and the horizontal rotation axes, and this can be seen in the figure where these axes cross in the center of a telescope 613 in the center unit 604.

The instrument may optionally comprise a display device for showing the image captured by the camera. The display device may be an integral part of the instrument, but more preferably, the display device is included in a removable control panel that can be used for remote control of the instrument via short range radio. It is even conceivable that the instrument is fully remote controlled, wherein the display device may be in the form of a computer screen located far away from the total station, and wherein information to and from the instrument are transferred over a wireless computer or radio telephone network.

The instrument can also be manually operated for aiming towards a desired target located at a remote position from the instrument using vertical and horizontal motion servo knobs 615 and 616.

According to the present invention, the instrument further comprises at least one camera adapted to capture a first image of the ground below the housing in a first camera position and orientation and a second image of the ground below the housing in a second camera position and orientation, means for identifying or an identifying unit adapted to identify an object point corresponding to a ground mark in the captured images, measuring means or a measuring unit adapted to measure first and second image coordinates of the object point in the first and second images, and a processor adapted to determine the height of the rotation center of the surveying instrument above the mark based on the first position and orientation, the first image coordinates, the second position and orientation, the second image coordinates, and camera calibration data.

The means for identifying the object point in the captured image may take the form of a cursor that can be moved across the display. Alternatively, the display may be a touch display, where the object point is identified by simply clicking or tapping on the display. This is preferred for the identification of the object point in the first image.

The means for identifying the object point may include further functionality implemented in the form of image processing software. In such case, the further functionality would be that object points may be identified based on certain features in the captured image, for example markers or patterns located at the desired ground mark. For example, an object point identified in a first image may be automatically identified in a second image based on patterns identified in the first image. In case the object point is automatically identified by the instrument, the user may be given the option to give a confirmation that the identified object point is correct before or during the aiming and measuring procedures. This is preferred for the identification of the object point in the second image.

Further, in order to facilitate the selection of the object point, it is preferred that, after the height of the instrument has been determined, it is indicated in the screen image the point corresponding to the instrument nadir, for example using a cross-hair such as shown in FIG. 3, a dot or similar. It is noted that the point in the screen image corresponding to the position of the instrument nadir depends on the height of the instrument.

According to an embodiment, a structured object may be arranged on the mark for facilitating identification of the object point in the captured images. The structured object may be an object comprising, for instance, an easily identifiable pattern such as concentric circles. The structured object may alternatively be a coin which also can provide an image with increased contrast in the area of the captured image corresponding to the mark. As the structured object is placed on top of the mark, the thickness of the structured object is taken into account when determining the height of the instrument over the ground (in relation to the mark).

Further, it is also envisaged that the height is determined using object points in the captured image corresponding to a number of points surrounding the mark and not necessarily the object point corresponding to the mark.

The means for measuring image coordinates of the object point in the displayed images, and the means for determining coordinates of the ground mark in relation to the rotation center of the surveying instrument are preferably implemented in the form of computer program code that is executed in a processor. However, implementation may also be made in dedicated hardware, such as in a special purpose microprocessor or a digital signal processor (DSP), firmware or similar.

The means for rotating the instrument is preferably implemented in association with the servo control system for the instrument for controlled activation of the drive motors 605 and 608 (see FIG. 6).

While specific embodiments have been described, the skilled person will understand that various modifications and alterations are conceivable within the scope as defined in the appended claims.

The invention claimed is:

1. A method for localizing, in relation to a mark located at a ground level, a surveying instrument having a housing including at least one camera, said method comprising:
    capturing a first image of the ground below the housing in a first camera position and orientation, said first camera position being eccentric to a vertical rotational axis of the surveying instrument;
    identifying an object point corresponding to the mark in the first image;
    measuring first image coordinates of the object point in the first image;
    capturing a second image of the ground below the housing in a second camera position and orientation;
    identifying, in the second image, the object point corresponding to the mark;
    measuring second image coordinates of the object point in the second image; and
    determining the height of a rotation center of the surveying instrument above the mark based on the first camera position and orientation, the first image coordinates, the second camera position and orientation, the second image coordinates, and camera calibration data.

2. The method of claim 1, further comprising determining the relative two-dimensional coordinates, in a horizontal plane, of the rotation center of the surveying instrument in relation to said mark based on the first camera position and orientation, the first image coordinates and camera calibration data and/or the second camera position and orientation, the second image coordinates and camera calibration data.

3. The method of claim 1, further comprising:
    orienting a horizontal pointing direction of said surveying instrument by aiming at a reference point located at a remote position from said surveying instrument, said reference point having a known location in a coordinate system.

4. The method of claim 1, wherein at least one of the mark located at the ground level and the surveying instrument is positioned at a known location in a coordinate system.

5. The method of claim 1, further comprising:
    rotating said housing around the rotation center so that the at least one camera is moved from the first camera position and orientation to a second camera position and orientation, said second camera position being eccentric to the vertical rotational axis of the surveying instrument, while retaining the rotation center of the surveying instrument in a fixed position.

6. The method of claim 1, wherein said instrument comprises at least two cameras of which a first camera is arranged in said first camera position and orientation and a second camera is arranged in said second camera position and orientation, said second camera position being eccentric to the vertical rotational axis of the surveying instrument.

7. The method of claim 1, wherein said instrument comprises at least two cameras of which a first camera is arranged in said first camera position and orientation and a second camera is arranged in said second camera position and orientation, said second camera position being coaxial with the vertical rotational axis of the surveying instrument.

8. The method of claim 1, wherein identifying, in the second image, the object point identified in the first image comprises:
    determining an epipolar line in the second image on which the object point is located based on the first camera position and orientation, the second camera position and orientation, the first image coordinates, and camera calibration data; and
    identifying, along the epipolar line in the second image, the object point identified in the first image.

9. The method of claim 8, wherein identifying, in the second image, the object point identified in the first image further comprises:
    selecting a minimum distance and a maximum distance from the first camera position along an imaging ray of the mark in the first image, between which minimum distance and maximum distance the mark is located;
    determining, based on the maximum distance and the minimum distance, a section of the epipolar line in the second image on which the object point is located; and
    identifying, along the section of the epipolar line in the second image, the object point identified in the first image.

10. The method of claim 8, further comprising:
determining whether the epipolar line is completely inside the second image.

11. A method for localizing, in relation to a mark located at a ground level, a surveying instrument having a housing including at least one camera, said method comprising:
capturing a first image of the ground below the housing in a first camera position and orientation, said first camera position being eccentric to a vertical rotational axis of the surveying instrument;
identifying an object point corresponding to the mark in the first image;
measuring first image coordinates of the object point in the first image;
capturing a second image of the ground below the housing in a second camera position and orientation;
identifying, in the second image, the object point corresponding to the mark;
measuring second image coordinates of the object point in the second image;
determining the height of a rotation center of the surveying instrument above the mark based on the first camera position and orientation, the first image coordinates, the second camera position and orientation, the second image coordinates, and camera calibration data;
selecting a minimum distance and a maximum distance from the first camera position along an imaging ray of the mark in the first image, between which minimum distance and maximum distance the mark is located;
determining, based on the maximum distance and the minimum distance, a section of the epipolar line in the second image on which the object point is located;
determining whether the epipolar line is completely inside the second image;
rotating, if the epipolar line is not completely inside the second image, the surveying instrument around the rotation center based on epipolar line data, the second camera position and orientation and second camera calibration data to a revised second camera position and orientation in order to obtain a new epipolar line within a revised second image;
capturing the revised second image using the camera in the revised second position and orientation; and
identifying, along the new epipolar line in the revised second image, the object point identified in the first image.

12. The method of claim 1, wherein the object point is identified in the images by means of operator selection or automatic image analysis.

13. A non-transitory computer readable medium program product comprising computer program code portions adapted to perform the method of claim 1 when loaded and executed in a computer.

14. A surveying instrument, comprising:
at least one camera adapted to capture a first image of the ground below the housing in a first camera position and orientation and a second image of the ground below the housing in a second camera position and orientation, said first camera position being eccentric to the vertical rotational axis of the surveying instrument;
an identifying unit adapted to identify an object point corresponding to a mark located at a ground level under said instrument in the captured images;
a measuring unit adapted to measure first and second image coordinates of the object point in the first and second images; and
a processor adapted to determine the height of a rotation center of the surveying instrument above the mark based on the first position and orientation, the first image coordinates, the second position and orientation, the second image coordinates, and camera calibration data.

15. The surveying instrument of claim 14, wherein said processor is further adapted to determine the relative two-dimensional coordinates, in a horizontal plane, of the rotation center of the surveying instrument in relation to said mark based on the first camera position and orientation, the first image coordinates and camera calibration data, and/or the second camera position and orientation, the second image coordinates and camera calibration data.

16. The surveying instrument of claim 14, wherein said processor is further adapted to orientate the horizontal pointing direction of said instrument in relation to a reference point located at a remote position from said surveying instrument, said reference point having a known location in a coordinate system.

17. The surveying instrument of claim 14, wherein at least one of the mark and the surveying instrument is positioned at a known location in a coordinate system.

18. The surveying instrument of claim 14, further comprising:
a rotating unit adapted to rotate, while retaining the rotation center of the surveying instrument in a fixed position, the surveying instrument around the rotation center of the surveying instrument so that the camera is moved from the first camera position and orientation to the second camera position and orientation, said second camera position being eccentric to the vertical rotational axis of the instrument.

19. The surveying instrument of claim 14, comprising at least two cameras of which a first camera is arranged in said first camera position and orientation and a second camera is arranged in said second camera position and orientation, said second camera position being eccentric to the vertical rotational axis of the instrument.

20. The instrument of claim 14, wherein the identifying unit is implemented as a cursor movable across the displayed images, using image processing software or using a touch display where the object point is identified by clicking or tapping on the display.

21. The method of claim 1, wherein at least one of the first and second camera positions is a position located external to the housing and at a desired distance from the housing.

* * * * *